United States Patent
Duncan

(10) Patent No.: US 7,039,829 B2
(45) Date of Patent: May 2, 2006

(54) APPARATUS AND METHOD FOR ENHANCING DATA AVAILABILITY BY IMPLEMENTING INTER-STORAGE-UNIT COMMUNICATION

(75) Inventor: Kurt Duncan, Wichita, KS (US)

(73) Assignee: LSI Logic Corporation, Milpitas, CA (US)

( * ) Notice: Subject to any disclaimer, the term of this patent is extended or adjusted under 35 U.S.C. 154(b) by 539 days.

(21) Appl. No.: 10/289,710

(22) Filed: Nov. 7, 2002

(65) Prior Publication Data

US 2004/0153717 A1    Aug. 5, 2004

(51) Int. Cl.
G06F 11/00    (2006.01)

(52) U.S. Cl. .......................................................... 714/6
(58) Field of Classification Search .................... 714/5, 714/6
See application file for complete search history.

(56) References Cited

U.S. PATENT DOCUMENTS

| | | | | |
|---|---|---|---|---|
| 4,837,680 | A * | 6/1989 | Crockett et al. ............. | 710/104 |
| 5,212,784 | A * | 5/1993 | Sparks ........................... | 714/6 |
| 5,787,242 | A * | 7/1998 | DeKoning et al. .............. | 714/5 |
| 5,889,935 | A * | 3/1999 | Ofek et al. ...................... | 714/6 |
| 5,933,653 | A * | 8/1999 | Ofek ............................... | 710/6 |
| 6,085,333 | A | 7/2000 | DeKoning et al. ............. | 714/7 |
| 6,173,377 | B1 * | 1/2001 | Yanai et al. ................. | 711/162 |
| 6,182,198 | B1 * | 1/2001 | Hubis et al. ................. | 711/162 |
| 6,304,980 | B1 * | 10/2001 | Beardsley et al. ............. | 714/6 |
| 6,324,654 | B1 * | 11/2001 | Wahl et al. ..................... | 714/6 |
| 6,405,294 | B1 * | 6/2002 | Hayter ........................ | 711/162 |
| 6,442,706 | B1 | 8/2002 | Wahl et al. ..................... | 714/6 |
| 6,457,109 | B1 | 9/2002 | Milillo et al. ................ | 711/162 |
| 6,480,970 | B1 * | 11/2002 | DeKoning et al. ............. | 714/6 |
| 6,578,120 | B1 * | 6/2003 | Crockett et al. ............ | 711/162 |
| 6,606,694 | B1 * | 8/2003 | Carteau ...................... | 711/162 |
| 6,618,818 | B1 * | 9/2003 | Wahl et al. ..................... | 714/6 |
| 6,631,477 | B1 * | 10/2003 | LeCrone et al. ............... | 714/5 |
| 6,643,795 | B1 * | 11/2003 | Sicola et al. ................... | 714/6 |
| 6,671,776 | B1 * | 12/2003 | DeKoning .................. | 711/114 |
| 6,754,682 | B1 * | 6/2004 | LeCrone et al. ............ | 707/204 |
| 6,813,688 | B1 * | 11/2004 | Wu et al. .................... | 711/114 |
| 6,842,825 | B1 * | 1/2005 | Geiner et al. ............... | 711/133 |
| 2002/0026603 | A1 * | 2/2002 | LeCrone et al. .............. | 714/6 |
| 2003/0170012 | A1 * | 9/2003 | Cochran ..................... | 386/125 |
| 2003/0217119 | A1 * | 11/2003 | Raman et al. ............. | 709/219 |
| 2004/0034808 | A1 * | 2/2004 | Day et al. ...................... | 714/6 |
| 2004/0078638 | A1 * | 4/2004 | Cochran ........................ | 714/6 |
| 2004/0098637 | A1 * | 5/2004 | Duncan et al. ................ | 714/6 |

OTHER PUBLICATIONS

Microsoft Press Computer Dictionary, Third Edition; Microsoft Press; 1997; pp. 297, 430.*
Enterprise System/9000; published Sep. 5, 1990; http://www-03.ibm.com/ibm/history/exhibits/mainframe/maingrame_PP9000.html.*
LSI Logic Storage System—Remote Volume Mirroring; ©2002 LSI Logic Corporation; http://www.lsilogicstorage.com/products/mirroring.html: Oct. 21, 2002.

* cited by examiner

*Primary Examiner*—Scott Baderman
*Assistant Examiner*—Joshua Lohn
(74) *Attorney, Agent, or Firm*—Suiter-West-Swantz PC LLC

(57) ABSTRACT

An apparatus and method for enhancing data availability by implementing inter-storage-unit communication in a data processing system. A Remote Volume Mirroring (RVM) system may be leveraged according to the present invention to provide volume failover by enhancing the functionality of the arrays, in a manner transparent to a host.

26 Claims, 3 Drawing Sheets

APPARATUS AND METHOD FOR ENHANCING DATA AVAILABILITY BY IMPLEMENTING INTER-STORAGE-UNIT COMMUNICATION

FIELD OF THE INVENTION

This invention relates generally to the field of storage systems, and particularly to an apparatus and method for enhancing data availability by implementing inter-storage-unit communication.

BACKGROUND OF THE INVENTION

Electronic data storage is one of the most important aspects of the modern economy. Almost every aspect of modern life has some element that requires the storage and retrieval of electronic data.

A storage system is an integrated collection of one or more controllers, one or more data storage devices such as disks, CD-ROMs, tapes, media loaders, and the like, and any required control software that provides storage services to a host such as a server on a network, a Web server on the Internet, a mainframe computer, or the like.

While a storage system is an important means to store and retrieve critical data, the physical mechanisms employed in the storage and retrieval process may fail, preventing storage and retrieval of the data. Many programmatic and hardware facilities have been utilized to provide continued access to the data. For example, intra-array data mirroring and conventional RAID techniques, when properly configured, may prevent data loss due to the failure of any single component. However, there are still various failure scenarios which may result in loss of access to data. For example, the failure of multiple components may disrupt access to a given data set, often resulting in permanent data loss.

Currently, methods exist to mirror entire data sets between arrays. If access to a specific data set is disrupted, the mirrored copy may be accessed in its place. Using these methods, however, the host must be reconfigured, either manually or programmatically, to recognize the existence of the data set in a logically different location. Additionally, for various logistical reasons, the host must be prevented from accessing the mirrored data set until it is needed. The process, then, of "failing over" from a non-accessible volume in a primary array to a copy of that volume in a secondary array, generally requires human intervention and may result in temporary loss of access to data. Furthermore, any information cached in the host which has not been written to a disk may be lost, since the host may not be able to retain that cache and apply it to a new logical target. The host simply cannot recognize that the new target is a mirror of the original data set.

Thus, it would be desirable to have an apparatus and method that provide volume failover from one array to another without requiring any special functionality on the host and without interrupting access to, or losing data from, the volume in question.

SUMMARY OF THE INVENTION

Accordingly, the present invention is directed to an apparatus and method for enhancing data availability by implementing inter-storage-unit communication. According to the present invention, volume failover is accomplished by enhancing the functionality of the arrays, in a manner transparent to the host.

According to a first aspect of the present invention, an exemplary data storage apparatus includes a first storage system and a second storage system. The first storage system includes a controller and a first array hosting a first volume, wherein the controller hosts the first array. The second storage system is coupled to the first storage system and includes a second array hosting a second volume, wherein the second volume contains a mirror of data on the first volume. The data storage apparatus provides storage services to a host. When the first volume is not accessible and the second volume is in existence, the controller accepts I/O requests from the host, and repacketizes and forwards the requests to the second array.

According to an additional aspect of the present invention, an exemplary storage system includes a controller, a first array hosting a first volume, and a second array hosting a second volume, wherein the first array is hosted by the controller. The second volume contains a mirror of data on the first volume. The storage system provides storage services to a host. When the first volume is not accessible and the second volume is in existence, the controller accepts I/O requests from the host and repacketizes and forwards the requests to the second array.

According to a further aspect of the present invention, an exemplary method for enhancing data availability of a data processing system includes the following steps: providing a controller that hosts a first array which in turn hosts a first volume; providing a second array hosting a second volume; intercommunicating information between the first array and the second array so that the second volume contains a mirror of data on the first volume; sending I/O requests by a host to the controller; sensing existence of the second volume by the first array when the first volume is not accessible; and accepting, repacketizing, and forwarding the I/O requests by the controller to the second array when the first volume is not accessible and the second volume is sensed to be in existence.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Figure 1:
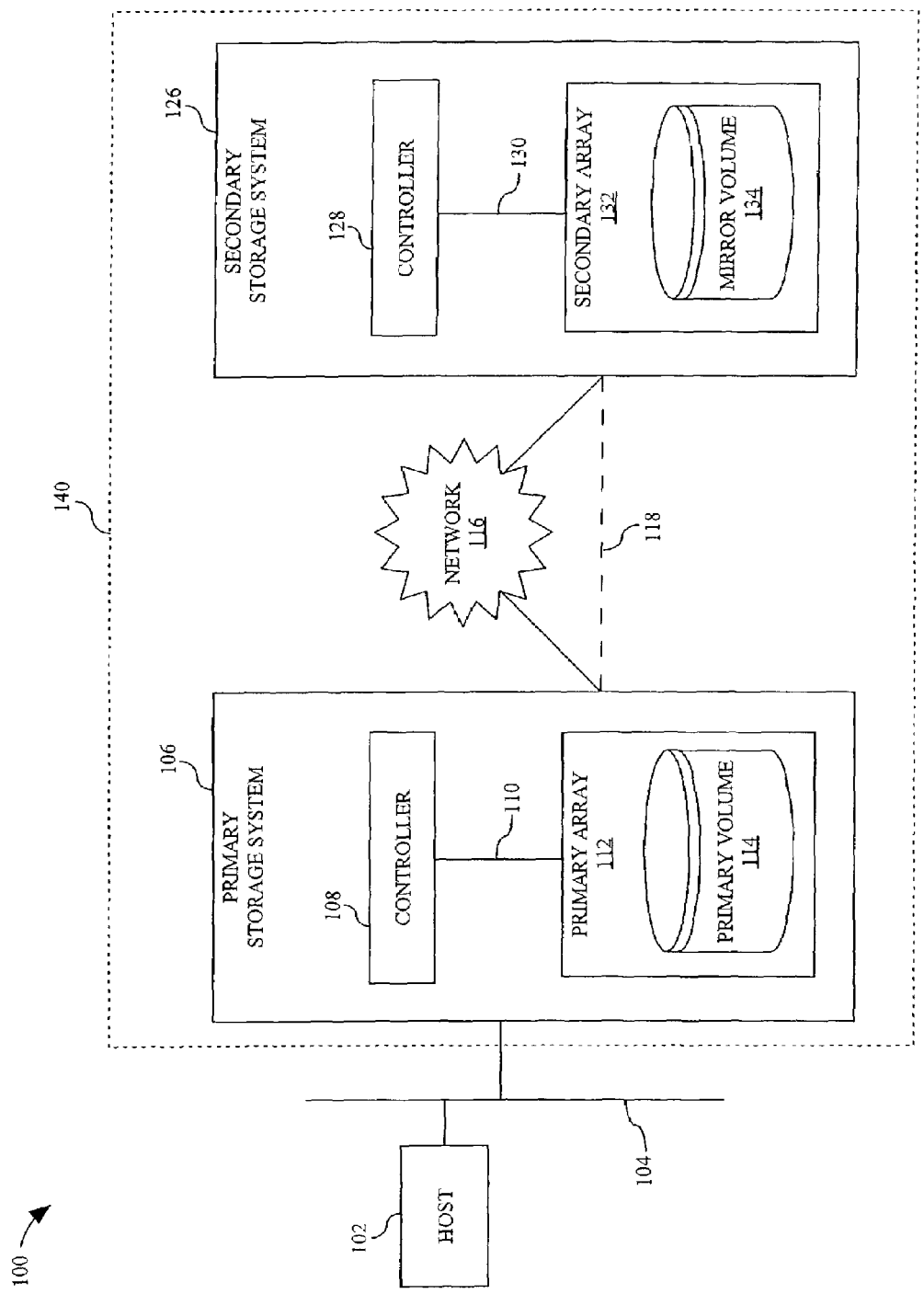
FIG. 1 is a schematic diagram of an exemplary data processing system in which the present invention may be implemented.

Referring first to FIG. 1, a schematic diagram of an exemplary data processing system 100 in which the present invention may be implemented is shown. The data processing system 100 includes a host 102, and a data storage apparatus 140 which includes a primary storage system 106 and a secondary storage system 126. It is understood that the data storage apparatus 140 may include two or more secondary storage systems. The host 102 is connected to the primary storage system 106 via an interface bus 104. The primary storage system 106 and the secondary storage system 126 are both connected to a network 116.

Data may be stored by the host 102 in the primary storage system 106. Data written to the primary storage system 106 are copied to the secondary storage system 126. For example, the copying process may be accomplished by the approach of Remote Volume Mirroring (RVM). A RVM system may be implemented both locally and remotely so that data generated locally (e.g., inside the primary storage system 106) by execution of an application program is additionally communicated over a network to a remote location (e.g., the secondary storage system 126) for replication. Typically, RVM enables recovery of the local computer system in the event of a temporary outage or, alternatively, transfer of data processing operations to a remote computer system if the local computer system is not able to recover, the outage is for a prolonged period of time, or a disaster permanently disables the local computer system. A RVM system may be operable in one of several modes, including a synchronous mode, an asynchronous mode, a near synchronous mode, and the like.

The primary storage system 106 may include one or more controllers 108 and one or more primary arrays 112. The primary array 112 may host one or more primary volumes 114 and are connected to the controller 108 via an interface bus 110. The secondary storage system 126 may include one or more controllers 128 and one or more secondary arrays 132. The secondary array 132 may host one or more mirror volumes 134 and are connected to the controller 128 via an interface bus 130. The interface buses 110, 130 may be any of several industry standard interface buses, including SCSI, IDE, EIDE, IPI, Fiber Channel, SSA, PCI, and the like.

It is understood that the host 102 in FIG. 1 may take various forms, such as a server on a network, a Web server on the Internet, a mainframe computer, or the like. The primary storage system 106 and the secondary storage system 126 are disk systems in these examples. Specifically, the primary storage system 106 and the secondary storage system 126 are each set up as shared virtual arrays to increase the flexibility and manageability of data stored within these systems. It is understood that the primary storage system 106 and the secondary storage system 126 may also be tape systems or the like. The network 116 may take various forms, such as a local area network (LAN), a wide area network (WAN), the Internet, an intranet, or the like. The network 116 may contain various links, including fiber optic links, packet switched communication links, enterprise systems connection (ESCON) fibers, SCSI cable, wireless communication links, and the like. The interface bus 104 may be any of several standard industry interface buses, including SCSI, Ethernet (LAN), Token Ring (LAN), and the like.

It is also understood that FIG. 1 is intended as an example of a data processing system in which the present invention may be implemented and not as an architectural limitation to the present invention. Those of ordinary skill in the art will appreciate that various combinations and arrangements may be employed without departing from the scope and spirit of the present invention. For example, the host 102 and the primary storage system 106 may both have a connection to a network, while the primary storage system 106 and the secondary storage system 126 may be connected by a LAN or WAN. Furthermore, the primary storage system 106 and the secondary storage system 126 may be connected to each other by a direct connection 118, rather than through the network 116. Moreover, the host 102 and the primary storage system 106 may be coupled through wireless communication or by a direct connection rather than via the interface bus 104.

Figure 2:
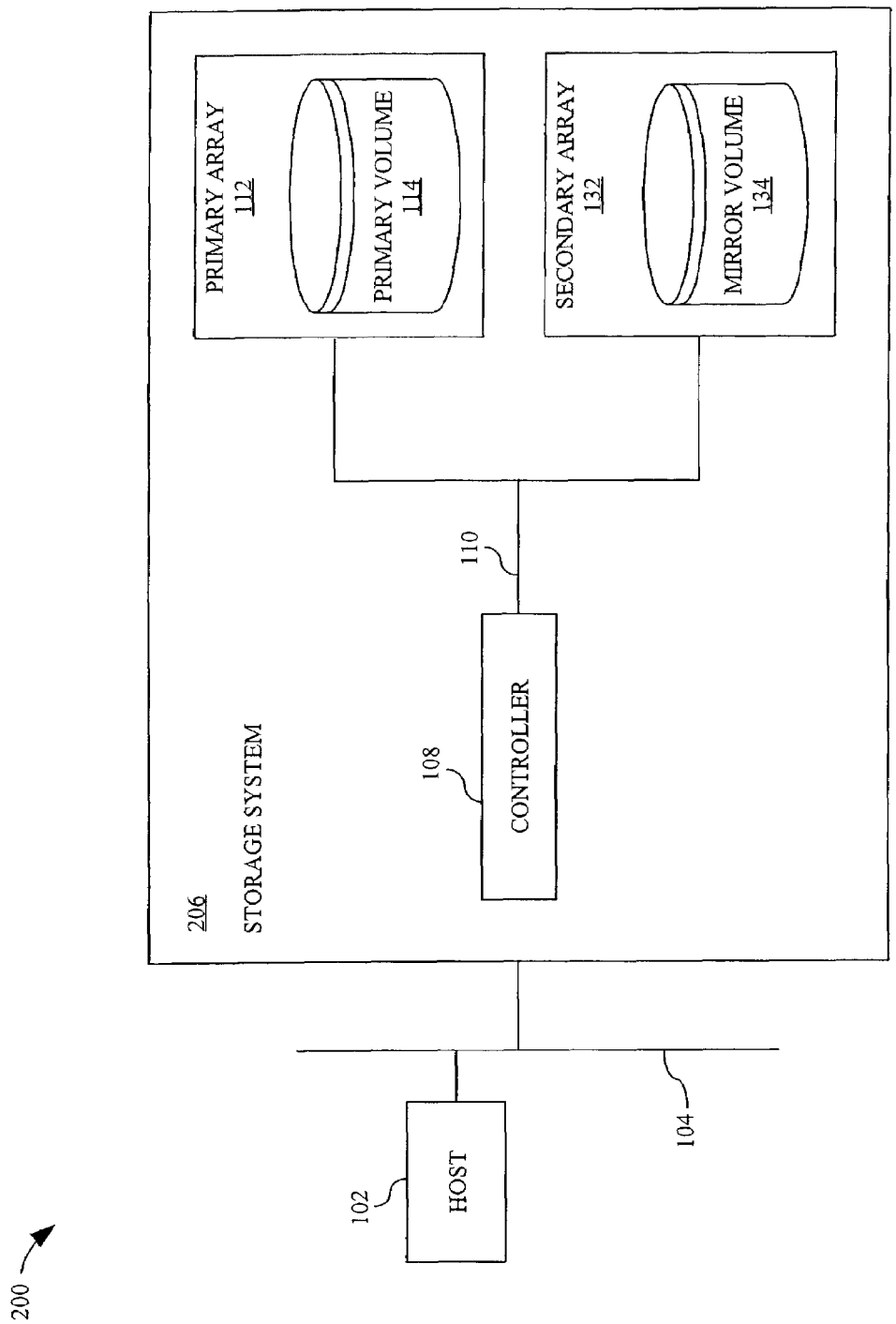
FIG. 2 is a schematic diagram of an additional exemplary data processing system in which the present invention may be implemented.

FIG. 2 is a schematic diagram of an additional exemplary data processing system 200 in which the present invention may be implemented. The data processing system 200 is similar to the data processing system 100 shown in FIG. 1. However, the data processing system 200 does not include any secondary storage systems. Instead, it has only one storage system 206 that includes both the primary array 112 that hosts the primary volume 114 and the secondary array 132 that hosts the mirror volume 134.

In detail, the data processing system 200 includes the storage system 206, and the host 102 such as a server on a network, a Web server on the Internet, a mainframe computer, or the like. The host 102 and the storage system 206 are connected via the interface bus 104. The Interface bus 104 may be any of several standard industry interface buses, including SCSI, Ethernet (LAN), Token Ring (LAN), and the like. Alternatively, the host 102 and the storage system 206 may be coupled through wireless communication, or connected by a direct connection. The storage system 206 includes one or more controllers 108, one or more primary arrays 112 which host one or more primary volumes 114, and one or more secondary arrays 132 which host one or more mirror volumes 134. The primary array 112 and the secondary array 132 are connected to the controller 108 via the interface bus 110. The interface bus 110 may be any of several industry standard interface buses, including SCSI, IDE, EIDE, IPI, Fiber Channel, SSA, PCI, and the like.

Data may be stored by the host 102 in the primary volume 114 which is hosted by the primary array 112. Data written to the primary volume 114 are copied to the mirror volume 134 which is hosted by the secondary array 132. The process of copying (i.e., mirroring) may be in a synchronous mode, an asynchronous mode, a near synchronous mode, or the like.

It is understood that FIG. 2 is intended as an example of a data processing system in which the present invention may be implemented and not as an architectural limitation to the present invention. For example, the primary volume 114 and the mirror volume 134 may each be hosted by separate controllers.

In FIGS. 1 and 2, according to the present invention, when the primary volume 114 is accessible, the controller 108, which hosts the primary volume 114, accepts I/O requests from the host 102 and forwards the requests to the primary volume 114. If the primary volume 114 becomes inaccessible due to the loss of non-redundant drives, channels, or for some other reasons, the primary array 112 may sense the existence of the mirror volume 134 on the secondary array 132. If the mirror volume 134 does not exist, the controller 108 may deny I/O requests from the host 102, and the host 102 can no longer perform I/O to the data set. If the mirror volume 134 exists, the controller 108, which hosts the failed primary volume 114, continues to accept I/O requests, but repacketizes and forwards the requests to the secondary array 132, which hosts the mirror volume 134.

The present invention provides great benefit because the volume failover procedure may be entirely transparent to the host 102, thus avoiding the necessity of reconfiguring or rebooting the host in order to regain access to the data set, and thereby avoiding the distinct possibility of data loss as dirty cache buffers are abandoned. The present invention may provide volume failover from one array to another without requiring any special functionality on the host and without interrupting access to, or losing data from, the volume in question.

Figure 3:
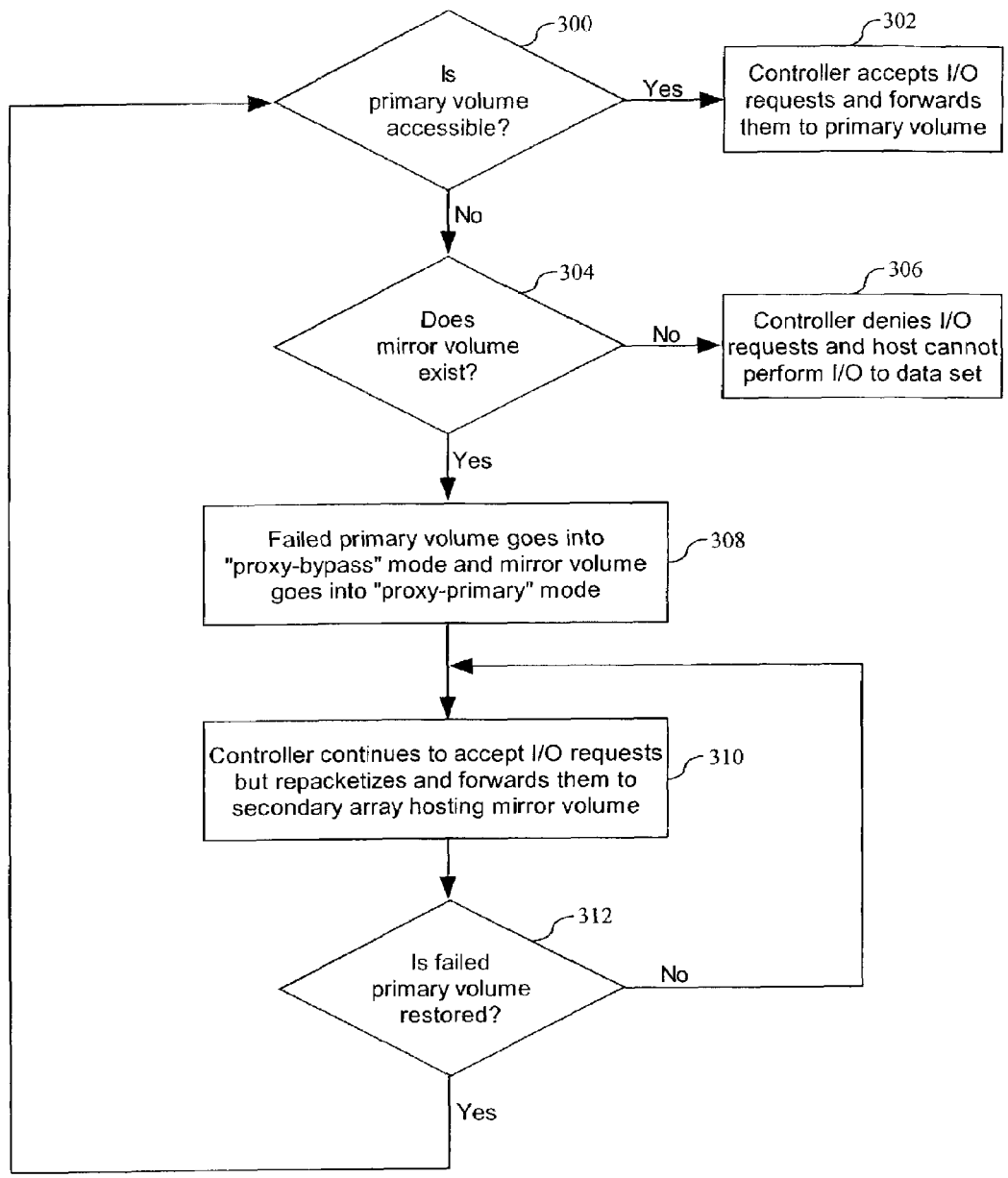
FIG. 3 is a flow chart of a process used for implementing inter-storage-unit communication in accordance with an exemplary embodiment of the present invention.

FIG. 3 is a flow chart of a process used for implementing inter-storage-unit communication in accordance with an exemplary embodiment of the present invention. A typical RVM model may be used as an example to show how to implement the present invention. In this model, a primary storage system includes a primary array that hosts a primary volume, to which normal host I/O activity is allowed. A secondary storage system includes a secondary array that hosts a mirror volume, to which normal host I/O is prevented. The primary and secondary arrays inter-communicate data and status information to bring the mirror volume to a state in which it contains a mirror of the data on the primary volume, and then maintain that state, assuming the interconnection remains viable. The primary and mirror volumes are maintained in a synchronous mode by their respective storage systems, and data transfers occur at Fibre Channel speeds. The model allows synchronous mirroring of critical data for disaster recovery, provides one or more copies of data through replication to protect against loss of data, and utilizes cross-mirroring between storage systems to protect both storage systems.

Referring to FIG. 3, the process of the present invention starts with the inquiry whether a primary volume is accessible 300. If the primary volume is accessible, a controller, which hosts the primary volume, accepts I/O requests from a host and forwards the requests to the primary volume 302. If the primary volume becomes inaccessible due to the loss of non-redundant drives, channels, or for some other reasons, a primary array which hosts the primary volume may sense the existence of a fully-synchronized mirror volume on a secondary array 304. If the mirror volume does not exist, the controller, which hosts the primary volume, may deny I/O requests from the host, and the host can no longer perform I/O to the data set 306. If the mirror volume does exist, the failed primary volume goes into a "proxy-bypass" mode, and the mirror volume goes into a "proxy-primary" mode 308. A volume in a "proxy-bypass" mode is not available for I/O, nor does the volume engage further in mirroring activities. At this point, the mirror is broken. The mirror volume is known to have current data and may be used in lieu of the failed volume.

Next, the controller which hosts the failed primary volume continues to accept I/O requests from the host, but repacketizes and forwards the requests to the secondary array which hosts the mirror volume, i.e., the live "proxy-primary" volume 310. This feature provides great benefit because the volume failover procedure may be entirely transparent to the host, thus avoiding the necessity of reconfiguring or rebooting the host in order to regain access to the data set, and thereby avoiding the distinct possibility of data loss as dirty cache buffers are abandoned. The present invention may provide volume failover from one array to another without requiring any special functionality on the host and without interrupting access to, or losing data from, the volume in question.

The status of the failed primary volume may then be checked 312. If the problem which resulted in the failed primary volume is not corrected and the failed primary volume is therefore not restored, the process returns to Step 310. If the problem which resulted in the failed primary volume is corrected, the failed primary volume may be restored using existing mirroring facilities. After the failed primary volume is restored, the next step is Step 300, which starts the whole process again.

It is understood that the typical RVM model described before is used only as an example to show how the present invention is implemented and not as an architectural limitation to the present invention. Other approaches may also be used without departing from the scope and spirit of the present invention. For example, RVM systems may be operable in an asynchronous mode, a near synchronous mode, or the like.

The hardware-based method and apparatus of the present invention is superior to host-based mirroring, in that the integrity of the mirror and the processing thereof do not depend upon operating system anomalies the host may have. The mirroring may not be broken by operating system failures, as may be the case with software-based mirroring.

The hardware-only solution of the present invention extends the benefits of volume failover in a consistent manner across all supported operating systems and platforms that the host may use. No additional host software may need to be written, installed, or administered.

The present invention also has many other advantages. For example, the present invention works in conjunction with the RVM feature: people may enjoy the benefits of RVM as well as gaining the benefits of the present invention, without investing in any additional hardware or facilities. Thus, the present invention may leverage currently-existing features to provide concrete benefits for incremental effort. Additionally, the present invention provides backup/recovery mechanisms, which do not present the problems normally associated with presentation of mirrors of data sets at multiple logical port addresses, since the host always sees one single target, regardless of the state of the various volumes. Moreover, the present invention has no inherent issues that would prevent it from working in conjunction with a host vendor or third-party volume and/or path management software.

It is understood that the specific order or hierarchy of steps in the methods disclosed are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that an apparatus and method for enhancing data availability by implementing inter-storage-unit communication of the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for enhancing data availability of a data processing system, comprising steps of:
    providing a controller that hosts a first array which in turn hosts a first volume;
    providing a second array for hosting a second volume;
    intercommunicating information between said first array and said second array so that said second volume contains a mirror of data on said first volume;
    sending I/O requests by a host to said controller;
    sensing existence of said second volume by said first array when said first volume is not accessible; and
    accepting, repacketizing, and forwarding said I/O requests by said controller to said second volume when said first volume is not accessible and when said second volume is sensed to be in existence.

2. The method of claim 1, wherein said intercommunicating step is accomplished by an approach of Remote Volume Mirroring (RVM).

3. The method of claim 1, further comprising accepting and forwarding said I/O requests by said controller to said first volume when said first volume is accessible.

4. The method of claim 1, further comprising denying said I/O requests by said controller when said first volume is not accessible and when said second volume is sensed not to be in existence.

5. The method of claim 1, further comprising a step of restoring said first volume after said first volume is not accessible.

6. The method of claim 5, wherein said restoring step is accomplished by mirroring from said second volume.

7. The method of claim 5, further comprising accepting and forwarding said I/O requests by said controller to said first volume after said first volume is restored and accessible.

8. An apparatus for enhancing data availability of a data processing system, comprising:
    means for proving a controller that hosts a first array which in turn hosts a first volume;
    means for providing a second array hosting a second volume;
    means for intercommunicating information between said first array and said second array so that said second volume contains a mirror of data on said first volume;
    means for sending I/O requests by a host to said controller;
    means for sensing existence of said second volume by said first array when said first volume is not accessible; and
    means for accepting, repacketizing, and forwarding said I/O requests by said controller to said second volume when said first volume is not accessible and when said second volume is sensed to be in existence.

9. The apparatus of claim 8, wherein said means for intercommunicating is accomplished by an approach of Remote Volume Mirroring (RVM).

10. The apparatus of claim 8, further comprising means for accepting and forwarding said I/O requests by said controller to said first volume when said first volume is accessible.

11. The apparatus of claim 8, further comprising means for denying said I/O requests by said controller when said first volume is not accessible and when said second volume is sensed not to be in existence.

12. The apparatus of claim 8, further comprising means for restoring said first volume after said first volume is not accessible.

13. The apparatus of claim 12, wherein said means for restoring including means for mirroring from said second volume.

14. The apparatus of claim 12, further comprising means for accepting and forwarding said I/O requests by said controller to said first volume after said first volume is restored and accessible.

15. An apparatus for providing data storage services to a host, comprising:
    a first storage system, coupled to said host, comprising a controller hosting a first array which in turn hosts a first volume; and
    a second storage system, coupled to said first storage system, comprising a second array hosting a second volume, wherein said second volume contains a mirror of data on said first volume;
    wherein said controller accepts I/O requests from said host and repacketizes and forwards said I/O requests to said second volume when said first volume is not accessible and when said second volume is sensed by said first array to be in existence.

16. The apparatus of claim 15, wherein said host is a server on a network.

17. The apparatus of claim 15, wherein said host is a Web server on Internet.

18. The apparatus of claim 15, wherein said host is a mainframe computer.

19. The apparatus of claim 15, wherein said controller accepts and forwards said I/O requests to said first volume when said first volume is accessible.

20. The apparatus of claim 15, wherein said controller denies said I/O requests when said first volume is not accessible and said second volume is not in existence.

21. A storage system for providing data storage services to a host, comprising:
    a controller hosting a first array which in turn hosts a first volume; and
    a second array hosting a second volume, wherein said second volume contains a mirror of data on said first volume;
    wherein said controller accepts I/O requests from said host and repacketizes and forwards said I/O requests to said second volume when said first volume is not accessible and when said second volume is sensed by said first array to be in existence.

22. The storage system of claim 21, wherein said host is a server on a network.

23. The storage system of claim 21, wherein said host is a Web server on Internet.

24. The storage system of claim 21, wherein said host is a mainframe computer.

25. The storage system of claim 21, wherein said controller accepts and forwards said I/O requests to said first volume when said first volume is accessible.

26. The storage system of claim 21, wherein said controller denies said I/O requests when said first volume is not accessible and when said second volume is not in existence.

* * * * *